(12) United States Patent
Daniel et al.

(10) Patent No.: US 6,491,960 B1
(45) Date of Patent: *Dec. 10, 2002

(54) ICE CONFECTION (75) Inventors: Adrian Daniel, Bedford; Richard Anthony Fenn, Gloucestershire; Jon Richard Oldroyd, Bedford, all of (GB)

(73) Assignee: Good Humor - Breyers Ice Cream, division of Conopco, Inc., Green Bay, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/521,721

(22) Filed: Mar. 9, 2000

(30) Foreign Application Priority Data

Mar. 10, 1999 (GB) .............................. 9905524
Jul. 23, 1999 (EP) .......................... 99305842

(51) Int. Cl.⁷ ................................ A23G 9/02
(52) U.S. Cl. ................. 426/565; 426/101; 426/656; 426/660
(58) Field of Search ................ 426/565, 101, 426/656, 660

(56) References Cited

U.S. PATENT DOCUMENTS

| | | | |
|---|---|---|---|
| 3,969,531 A | | 7/1976 | Cornelius |
| 4,738,862 A | | 4/1988 | Bee |
| 4,826,656 A | | 5/1989 | Huber et al. |
| 5,620,732 A | * | 4/1997 | Clemmings et al. |
| 5,852,172 A | * | 12/1998 | Griffith |
| 5,972,679 A | * | 10/1999 | Griffith |
| 6,017,574 A | * | 1/2000 | Clemmings et al. |
| 6,090,917 A | * | 7/2000 | Lillford et al. |
| 6,098,867 A | * | 8/2000 | Byass et al. |
| 6,156,880 A | * | 12/2000 | Lillford et al. |
| 6,162,789 A | * | 12/2000 | Lillford et al. |
| 6,200,622 B1 | * | 3/2001 | Clemmings et al. |

FOREIGN PATENT DOCUMENTS

DE 197 32 132 A1 1/1998

(List continued on next page.)

OTHER PUBLICATIONS

"Antifreeze Proteins And Their Potential Use In Frozen Foods", Marilyn Griffith and K. Vanya Ewart, Biotechnology Advances, vol. 13, No. 3, pp. 375–402, 1995.*

"A Low–Temperature Scanning Electron Microscopy Study Of Ice Cream, Techniques and General Microstructure", K.B. Caldwell, H.D. Goff and D.W. Stanley, Food Structure, vol. 11 (1992), pp. 1–9.*

"Low Temperature Sugar–Water Equilibrium Curve By A Rapid Calorimetric Method", B. de Cindio, S. Correra & V. Hoff, Journal of Food Engineering, vol. 24 (1995), pp. 405–415.*

"Unbiased Estimation Of The Euler–Poincare Characteristic", B. Pinnamaneni, C. Lantuéjoul, J. Jernot and J. Chermant, Acta Stereol, 1989; 8/2, pp. 101–106.*

*Primary Examiner*—Nina Bhat
(74) *Attorney, Agent, or Firm*—Gerard J. McGowen, Jr.

(57) ABSTRACT

An unaerated ice confection in the form of thin, unsupported, discrete pieces which are stable during packaging, storage and distribution wherein the ice confection comprises an antifreeze protein and has the following mechanical properties;

Δ modulus/original modulus $\geq 0.4$, and/or

Δ strength/original strength $\geq 0.4$;

providing that when Δ modulus/original modulus $\leq 6.0$,

Δ modulus $\geq 50$ MPa, and/or when

Δ strength/original strength $\leq 2.0$,

Δ strength $\geq 0.2$ MPa.

8 Claims, 5 Drawing Sheets

FOREIGN PATENT DOCUMENTS

| | | |
|---|---|---|
| DE | 197 32 135 A1 | 2/1998 |
| EP | 0 843 010 A1 | 5/1998 |
| GB | 1050213 | 12/1966 |
| GB | 1313807 | 4/1973 |
| GB | 2 315 662 A | 2/1998 |
| GB | 2 315 753 A | 2/1998 |
| GB | 2 328 136 A | 2/1999 |
| WO | 92/22581 | 12/1992 |
| WO | 96/39878 | 12/1996 |
| WO | 97/02343 | 1/1997 |
| WO | WO 98/04146 * | 2/1998 |
| WO | 98/04147 | 2/1998 |
| WO | 98/04148 | 2/1998 |
| WO | 98/04699 | 2/1998 |
| WO | 98/22591 | 5/1998 |
| WO | 98/41106 | 9/1998 |
| WO | 98/41109 | 9/1998 |
| WO | 99/37164 | 7/1999 |
| WO | 99/38386 | 8/1999 |

* cited by examiner

ICE CONFECTION

TECHNICAL FIELD OF THE INVENTION

The invention relates to novel ice confections containing an antifreeze protein. In particular the invention relates to novel ice confections in the form of thin, unsupported discrete pieces which are stable during packaging, storage and distribution.

BACKGROUND TO THE INVENTION

It is highly desirable to be able to manufacture ice confections having novel shapes, properties and/or textures. Until now, however the ability to provide such a high degree of novelty and interest to the products has been limited. Products have to be manufactured with the ability to survive packaging, storage and distribution.

In particular, until now it has not been possible to provide thin, unsupported pieces of ice confection that are sufficiently strong enough to withstand packaging, storage and distribution regimes. Additionally, it has not been possible to provide such thin, unsupported pieces of ice confection which are also crispy, hard and brittle but still able to be bitten (i.e. they can fracture when eaten in the mouth). Obviously such thin, crispy, brittle products have a particularly high risk of breaking during packaging or transport We have now shown that inclusion of specific antifreeze proteins into unaerated ice confections results in the formation of a strong, close-packed continuous network of ice crystals within the ice confection. As a result the ice confection is provided with specific defined mechanical properties. Such ice confections are able to be manufactured into thin, unsupported pieces which are brittle and crispy but nevertheless able to withstand packaging, storage and transportation.

WO 98/04146 (Unilever) discloses that AFPs can be incorporated into frozen food products such as ice confections to provide desirable product properties providing that the product and processing conditions are varied such that the ice crystals provided in the product have an aspect ratio of more than 1.9, preferably from 1.9 to 3.0. The specific examples given are all aerated ice cream compositions. As shown by comparative Examples A to C below, the addition of antifreeze proteins to aerated ice cream does not significantly change the mechanical properties of the ice cream. WO 98/04146 does not teach that it is possible to provide specific ice confection products having novel mechanical properties and that such ice confections can advantageously be used to provide thin, unsupported pieces.

WO 96/39878 (The Pillsbury Company) discloses a method for making a frozen composition for storage, the method not requiring a hardening step prior to storage. The frozen composition contains an antifreeze protein, in particular Type I AFP. Examples show the preparation of an aerated ice cream and an aerated frozen yogurt. As shown by comparative Examples A to C below, the addition of anti-freeze proteins to aerated ice cream does not significantly change the mechanical properties of the ice cream. WO 96/39878 does not teach that it is possible to provide specific ice confection products having novel mechanical properties and that such ice confections can advantageously be used to provide thin, unsupported pieces.

U.S. Pat. No. 5,118,792 (Warren et al) discloses the addition of fusion proteins, and in particular the fusion protein protein A-Saf5 into foods which are to be consumed frozen, for example, ice cream, frozen yogurt, ice milk, sherbet, popsicles and frozen whipped cream. No examples are given where a final ice confection product is provided containing such fusion proteins. It is shown in Example 3B that when a popsicle formulation is used within the "splat assay", growth of the ice crystals is restricted.

In our co-pending application PCT/EP98/08552 (published as WO 99/37164 on Jul. 29, 1999 after the priority date of the present application) a frozen food product comprising AFPs having an average ice crystal size of from 0.01 to 20 micrometers is disclosed. The application is concerned with reducing the aggregation of ice crystals as much as possible such that a soft, creamy product is provided. The examples disclose the manufacture of ice cream flakes. However, the ice cream used is aerated and as shown by Comparative Examples A to C below, such ice cream flakes are not self-supporting in that they collapse during storage and distribution. WO 99/37164 does not disclose that it is possible to provide thin, self-supporting, discrete pieces of ice confection which are stable to storage and distribution, providing that the ice confection has specific mechanical properties.

DISCLOSURE OF THE INVENTION

Accordingly the invention provides an unaerated ice confection in the form of thin, unsupported, discrete pieces which are stable during packaging, storage and distribution wherein the ice confection comprises an antifreeze protein and has the following mechanical properties;

$\Delta$ modulus/original modulus $\geq 0.4$, and/or $\Delta$ strength/original strength $\geq 0.4$; providing that when $\Delta$ modulus/original modulus $\leq 6.0$, $\Delta$ modulus $\geq 50$ MPa, and/or when $\Delta$ strength/original strength $\leq 2.0$, $\Delta$ strength $\geq 0.2$ MPa.

By thin is meant 5 mm or less in thickness. Typically the thin layers will be from 0.5 to 5 mm in thickness. In particular approximately from 2 to 3 mm.

By pieces is meant for example flakes, sheets, tablets, slabs, shavings, chips, hoops, crisps or layers. In general the pieces will not be spherical. All dimensions are not identical. One dimension is from 0.5 to 5 mm and at least one other dimension is substantially longer than this.

By unsupported is meant that the thin crispy pieces are substantially in contact only with air and are not, for example, a layer upon a second ice confection which provides the thin layer with support.

Preferably $\Delta$ modulus/original modulus $\geq 0.4$; providing that when $\Delta$ modulus/original modulus $\leq 6.0$, $\Delta$ modulus $\geq 70$ MPa, preferably $\geq 90$ MPa, most preferably $\geq 100$ MPa.

Most preferably $\Delta$ modulus/original modulus $\geq 1.0$; providing that when $\Delta$ modulus/original modulus $\leq 6.0$, $\Delta$ modulus $\geq 100$ MPa, preferably $\geq 200$ MPa Preferably $\Delta$ strength/original strength $\geq 0.7$. Most preferably $\Delta$ strength/original strength $\geq 1.5$.

By modulus is meant the apparent elastic modulus (E) as determined using a four point bend test. Example 1 gives the standard procedure for performing a four point bend test.

Therefore $\Delta$ modulus ($\Delta$E) means the change in modulus between two ice confections whose formulation and process of manufacture are identical in all respects except that the first ice confection includes in its composition an antifreeze protein, and the second ice confection has no antifreeze protein included in its composition (the control composition). Original modulus ($E_{orig}$) is the modulus measured in the control composition.

By strength is meant the flexure strength ($\sigma_u$) which can be defined as the maximum stress that a material can withstand, under the particular conditions. The flexure strength is given by the stress at a point of maximum force on the force versus displacement curve recorded during a four point bend test.

Therefore $\Delta$ strength ($\Delta\sigma_u$) means the change in strength between two ice confections whose formulation and process of manufacture are identical in all respects except that the first ice confection includes in its composition an antifreeze protein, and the second ice confection has no antifreeze protein included in its composition (the control composition). Original strength ($\sigma_{u\ orig}$) is the modulus measured in the control composition.

In addition to changes in the apparent elastic modulus and flexure strength, an increase in product hardness is provided by the ice confections according to the invention.

For ice confections frozen with agitation, for example in an ice cream freezer (such as a scraped surface heat exchanger), the increase in hardness can be measured using the Vickers hardness test. Details of the Vickers hardness test are given in Example 3.

The degree to which the Vickers Hardness ($H_v$) of the ice confection is increased by the addition of the antifreeze protein depends in part on the ice content of the ice confection.

However, generally $\Delta H_v/H_{v\ orig} \geq 0.3$, providing that when $\Delta H_v/H_{v\ orig} \leq 5.0$, $\Delta H_v \geq 0.3$.

Preferably $\Delta H_v/H_{v\ orig} \geq 1.0$, providing that when $\Delta H_v/H_{v\ orig} \leq 5.0$, $\Delta H_v \geq 1.25$.

Most preferably either $\Delta H_v/H_{v\ orig} \geq 6.0$ or $\Delta H_v/H_{v\ orig} \leq 6.0$ and $\Delta H_v \geq 2.0$.

Where $\Delta H_v$ is the change in Vickers Hardness between two ice confections whose formulation and process of manufacture are identical in all respects except that the first ice confection includes in its composition an antifreeze protein, and the second ice confection has no antifreeze protein included in its composition (the control composition). $H_{v\ orig}$ is the original Vickers Hardness measured in the control composition.

By close-packed continuous network of ice crystals is meant that any given ice crystal is connected to at least one other ice crystal.

In unaerated ice confections which have been frozen with agitation, the degree of network formation can be measured as contiguity. Contiguity is defined as the ratio of the particle go particle interface area divided by the total interface area. It is thus a measure of the degree of network formation of the particle phase. Example 4 shows a method for the measurement of contiguity.

Unaerated ice confections according to the invention have a contiguity of at least 0.2 for an ice content of from 50 to 90%, preferably from 54 to 85% by weight, when measured at −18° C.

In unaerated ice confections which have been frozen by any means, the degree of network formation can be measured as the Euler-Poincare characteristic of the ice phase. The Euler-Poincare characteristic is a measure of the degree of network formation of a particular phase. The lower and more negative the value of the Euler-Poincare characteristic, the greater the continuity of the phase in question. Example 5 shows a method for the measurement of the Euler-Poincare characteristic Unaerated ice confections according to the invention have an ice phase Euler-Poincare characteristic of less than −150 mm as measured by the test given in Example 5 for an ice content of from 50 to 90%, preferably from 54 to 85% by weight, when measured at −18° C.

By AFP is meant a protein which has significant ice recrystallisation inhibition properties as measured in accordance with Example 2. The AFP provides an ice particle size upon recrystallisation of less than 20 $\mu$m, more preferred from 5 to 15 $\mu$m.

Preferably the ice confection comprises at least 0.0005% by weight antifreeze protein, more preferably 0.0025% by weight antifreeze protein. Typically the ice confection will comprise from 0.0005% by weight to 0.005% by weight antifreeze protein.

For some applications it may be advantageous to include a mixture of two or more different AFPs into the food product.

The AFP for use in products of the invention can be any AFP suitable for use in food products. Examples of suitable sources of AFP are for example given in the article "Antifreeze proteins and their potential use in frozen food products", Marylin Griffith and K. Vanya Ewart, Biotechnology Advances, vol 13, pp375–402, 1995 and in patent applications WO 98/04699, WO 98/04146, WO 98/04147, WO 98/04148 and WO 98/22591.

The AFPs can be obtained from their sources by any suitable process, for example the isolation processes as described in the above mentioned documents.

One possible source of AFP materials is fish. Examples of fish AFP materials are antifreeze glycoproteins (AFGP) (for example obtainable from Atlantic cod, Greenland cod and Tomcod), Type I AFP (for example obtainable from Winter flounder, Yellowtail flounder, Shorthorn sculpin and Grubby sculpin), Type II AFP (for example obtainable from Sea raven, Smelt and Atlantic herring) and Type III AFP (for example obtainable from Ocean Pout, Atlantic wolffish, Radiated shanny, Rock gunnel and Laval's eelpout). A preferred example of the latter type is described in WO 97/02343.

Another possible source of AFP material are invertebrates. Also AFPs may be obtained from Bacteria.

A third possible source of AFP material are plants. Examples of plants containing AFPs are garlic-mustard, blue wood aster, spring oat, winter cress, winter canola, Brussels sprout, carrot, Dutchman's breeches, spurge, daylily, winter barley, Virginia waterleaf, narrow-leaved plantain, plantain, speargrass, Kentucky bluegrass, Eastern cottonwood, white oak, winter rye, bittersweet nightshade, potato, chickweed, dandelion, spring and winter wheat, triticale, periwinkle, violet and grass.

Both natural occurring species may be used or species which have been obtained through genetic modification. For example micro-organisms or plants may be genetically modified to express AFPs and the AFPs may then be used in accordance to the present invention.

Genetic manipulation techniques may be used to produce AFPs. Genetic manipulation techniques may be used to produce AFPs having at least 80%, more preferred more than 95%, most preferred 100% homology to the AFPs directly obtained from the natural sources. For the purpose of the invention these AFPs possessing this high level of homology are also embraced within the term "AFPs".

The genetic manipulation techniques may be used as follows: An appropriate host cell or organism would be transformed by a gene construct that contains the desired polypeptide. The nucleotide sequence coding for the polypeptide can be inserted into a suitable expression vector encoding the necessary elements for transcription and translation and in such a manner that they will be expressed under appropriate conditions (for example in proper orientation and correct reading frame and with appropriate targeting and expression sequences). The methods required to construct these expression vectors are well known to those skilled in the art.

A number of expression systems may be utilised to express the polypeptide coding sequence. These include, but are not limited to, bacteria, yeast insect cell systems, plant cell culture systems and plants all transformed with the appropriate expression vectors.

A wide variety of plants and plant cell systems can be transformed with the nucleic acid constructs of the desired polypeptides. Preferred embodiments would include, but are not limited to, maize, tomato, tobacco, carrots, strawberries, rape seed and sugar beet.

For some natural sources the AFPs may consist of a mixture of two or more different AFPs.

Preferably the antifreeze protein is chosen such that it gives an aspect ratio of more than 1.9 to the ice crystal, preferably from 1.9 to 3.0, more preferably from 2.0 to 2.9, even more preferred from 2.1 and 2.8 (see WO 98/04146). Aspect ratio is defined as the maximum diameter of a particle divided by its minimum diameter. The aspect ratio can be determined by any suitable method. A preferred method is illustrated in the Examples (Example 6).

For the purpose of the invention the preferred AFPs are derived from fish. Especially preferred is the use of fish proteins of the type III, most preferred HPLC 12 as described in our case WO 97/02343.

Ice confections which are able to form thin, unsupported, discrete pieces and show the required change in mechanical properties on the addition of the antifreeze protein include unaerated milk containing frozen confections such as ice-cream, frozen yoghurt, and frozen custard, sherbet and milk ice, as well as unaerated frozen confections which do not typically contain milk such as water ices, sorbet, granitas and frozen fruit purees.

Preferably the ice confection is selected from an unaerated ice cream, water ice and milk ice.

By water ice is meant a frozen solution made essentially from sugar, water, fruit acid or other acidifying agent, colour, fruit or fruit flavouring.

By unaerated is meant an ice confection having an overrun of 10% or less (equivalent to 0.09 volume fraction of air). During the processing of the ice confection no deliberate steps such as whipping are undertaken to increase the gas content of the product. However, it should be realised that during normal methods for the preparation of non-aerated ice confections, low levels of gas or air may be incorporated into the product, for example due to the mixing conditions used.

Preferably the unaerated ice confection used to provide the thin, unsupported pieces will typically have an ice content of at least 30% by volume when measured at −18° C., more preferably at least 40% by volume when measured at −18° C., most preferably at least 50% by volume when measured at The ice content may be determined following the techniques described in the article by B de Cindio and S Correra in the Journal of Food Engineering, Volume 24, pages 405–415, 1995 The enthalpy data required for this technique is obtained using adiabatic calorimetry (Holometrix Adiabatic Calorimeter). The ice contents as expressed herein are measured on an 80 g sample poured into the sample holder of the calorimeter and cooled to −75° C. by placing the assembly in dry ice prior to placing in the calorimeter (precooled to between −70° C. and −80° C.). The enthalpy data obtained was analysed to give ice content as a function of the temperature following the method of Cindio and Carrera.

Preferably the unaerated ice confection used to provide the thin unsupported pieces has a total soluble solids content of less than 40% by weight, preferably less than 25% by weight, most preferably less than 15% by weight. For low calorie products, the total soluble solids content may be as low as, for example, approximately 5% by weight.

The total soluble solids content is measured at 4° C. and is the % by weight of the total composition that is dissolved at that temperature.

The thin unsupported pieces of the invention have a reduced tendency to aggregate and therefore the free-flowing nature of the particulate material can be maintained over storage, even if the storage temperature is relatively high.

The invention is particularly useful for making frozen confectionery products akin to savoury snacks such as crisps, hoops, wafers, thin sticks etc. Typically each snack-like product will have a volume of from 0.5 to 40 ml, more preferred from 1 to 20 ml, especially 1.5 to 10 ml.

A further example of a product according to the invention is a flat lollipop.

The thin, unsupported pieces may be provided by any suitable process.

A first example process for the manufacture of thin, unsupported pieces includes quiescent freezing of a thin film of unaerated ice confection onto a slowly rotating drum freezer, and then scraping the frozen layer off. The frozen layer breaks up to provide thin pieces as discrete flakes.

A second example process for the manufacture of thin, unsupported pieces is by extrusion.

DESCRIPTION OF THE DRAWINGS

In FIGS. 3 to 13, AFP containing examples are shown by (□), control samples containing no AFP are shown by (♦)

EXAMPLES

The invention will now be illustrated by means of the following examples.

Example 1

Four Point Bend Test

The standard four point bend test can be used to determine a number of mechanical properties of ice confection materials. The mechanical properties being measured are Young's modulus (apparent) and flexure strength.

Figure 1:
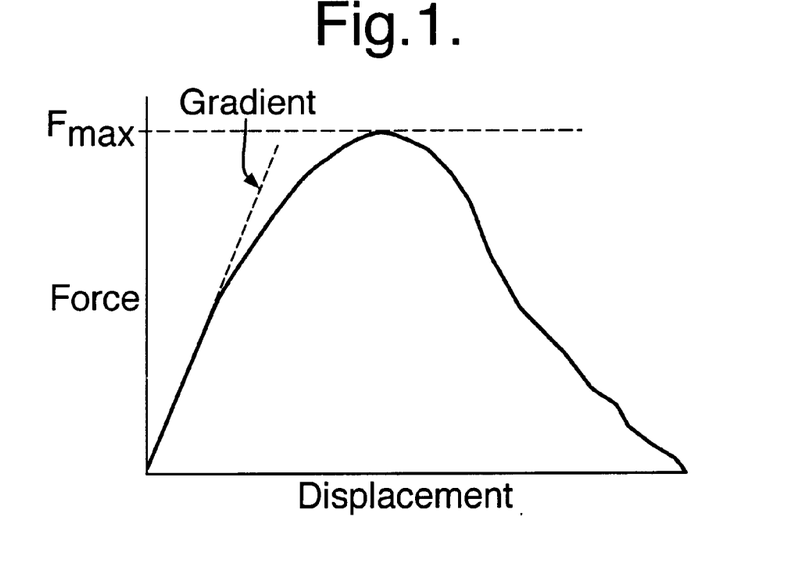
FIG. 1 shows a schematic of the data recorded during a three-point or four-point bend test.

In a bend test, a test piece is deformed whilst measuring the applied force and test piece deflection. A schematic data set for an ice confection is shown in FIG. 1. The apparent elastic modulus is determined by the gradient of the initial linear part of this curve.

The 4-point bend test requires production of a parallel sided rectangular bar of ice confection material. This may be obtained by any suitable means.

In this particular application the parallel sided rectangular bar of ice confection was made using aluminium moulds producing bars having the dimensions 25×25×200 mm.

a) Quiescent Frozen Ice Confections

The liquid ice confection pre-mix was poured into a mould which had been pre-cooled in a blast freezer at −35° C. for at least 30 minutes, the mould was then placed in a blast freezer at −35° C. for at least 2 hours. The samples were then de-moulded and stored at −25° C. until testing (conducted after 5–6 days). 18 to 24 hours prior to testing the samples were equilibrated by storing at −18° C., the temperature at which all tests were performed. A minimum of 10 bars was tested for each sample set and the mean value of each sample set was recorded as the value of the mechanical property being measured.

b) Ice Confections Frozen with Agitation

The ice confection was extruded from the ice cream freezer (scraped surface heat exchanger) at a temperature of from −1° C. to −5° C., depending on the ice confection, into a mould which had been pre-cooled in a blast freezer at −35° C. for at least 30 minutes, the mould was lined with silicon paper to prevent ice-metal adhesion. The sample was then prepared as above for quiescent frozen samples.

The general test applied to all types of solids is described in "Biomechanics Materials. A practical Approach" Ed. J. F. V. Vincent, Pub. IRL Press, Oxford University Press, Walton Street, Oxford, 1992 and "Handbook of Plastics Test materials" Ed. R. P. Brown, Pub. George Godwin Limited, The Builder Group, 1–3 Pemberton Row, Fleet Street, London, 1981. Testing involves placing each bar onto 2 supports and bending it until fracture by applying pressure from two upper supports, that are separated by 85 mm, centrally on the bar's top surface. The force applied in bending and the displacement of the moving contact are recorded throughout the test. The speed of descent of the moving support was 50 mm per minute.

The apparent elastic modulus of the material is given by the equation;

$$E = \frac{(0.21) \cdot gradient \cdot S^3}{BD^3}$$

where the gradient is that shown in FIG. 1, S is the span (distance) between the supporting contacts beneath the test bar, B is the width of the bar and D is the depth of the bar.

For these tests the span (S) was 170 mm.

With reference to FIG. 1, the strength of a material under three point bend conditions, is given as;

$$\sigma_u = \frac{(0.75) \cdot F_{max} S}{BD^2}$$

where $\sigma_u$ is the flexure strength and $E_{max}$ is the maximum force recorded.

Example 2

Method of determining whether an AFP possesses ice recrystallisation inhibition properties.

Recrystallisation inhibition properties can measured using a modified "splat assay" (Knight et al, 1988). 2.5 µl of the solution under investigation in 30% (w/w) sucrose is transferred onto a clean, appropriately labelled, 16 mm circular coverslip. A second coverslip is placed on top of the drop of solution and the sandwich pressed together between finger and thumb. The sandwich is dropped into a bath of hexane held at −80° C. in a box of dry ice. When all sandwiches have been prepared, sandwiches are transferred from the −80° C. hexane bath to the viewing chamber containing hexane held at −6° C. using forceps pre-cooled in the dry ice. Upon transfer to −6° C., sandwiches can be seen to change from a transparent to an opaque appearance. Images are recorded by video camera and grabbed into an image analysis system (LUCIA, Nikon) using a 20×objective. Images of each splat are recorded at time=0 and again after 60 minutes. The size of the ice-crystals in both assays is compared by placing the slides within a temperature controlled cryostat cabinet (Bright Instrument Co Ltd, Huntington, UK). Images of the samples are transferred to a Quantimet 520 MC image analysis system (Leica, Cambridge UK) by means of a Sony monochrome CCD videocamera. Ice crystal sizing was performed by hand-drawing around ice-crystal. At least 400 crystals were sized for each sample. The ice crystal size was taken as being the longest dimension of the 2D projection of each crystal. The average crystal size was determined as the number average of the individual crystal sizes. If the size at 30–60 minutes is similar or only moderately (less than 10%) increased compared to the size at t=0, and/or the crystal size is less than 20 micrometer, preferably from 5 to 15 micrometer this is an indication of good ice recrystallisation inhibition properties

Example 3

Standard Vickers Hardness Test

The Vickers Hardness test is an indentation test that involves pushing a pyramid shaped indentor into the surface of material and recording the force applied as a function of tip displacement. Force and displacement are measured during the indentation loading cycle and the unloading cycle.

The test is described in "Handbook of Plastics Test materials" Ed. R. P. Brown, Pub. George Godwin Limited, The Builder Group, 1–3 Pemberton Row, Fleet Street, London, 1981.

Figure 2:
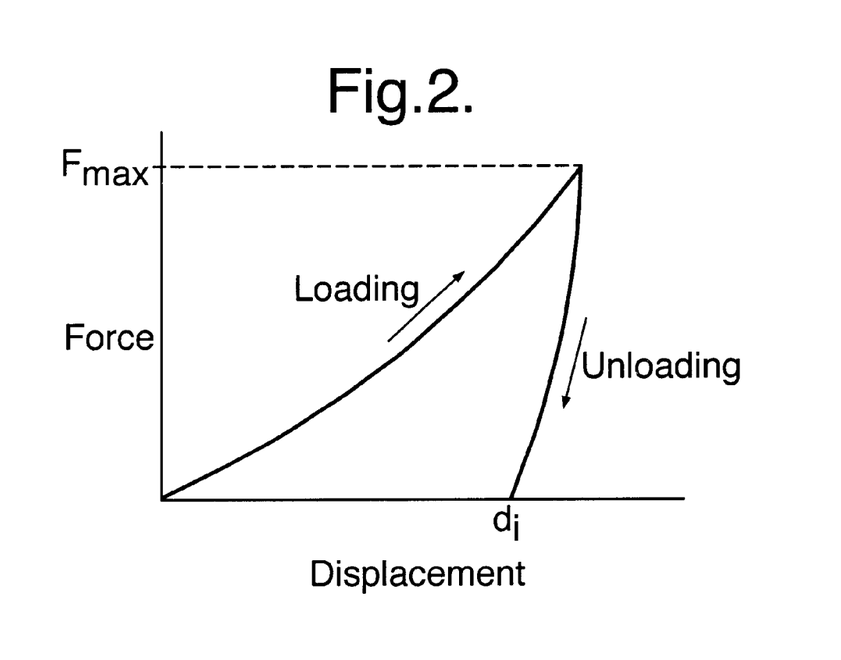
FIG. 2 shows a schematic diagram of typical force vs. displacement curve for a Vickers Hardness Test.

The Vickers pyramid geometry is an engineering industry standard (BSi 427, 1990). It has an apex angle at the tip of 136°. Hardness is determined as;

$$H_V = \frac{F_{max}}{A}$$

where $H_v$ is the Vickers Hardness, $F_{max}$ is the maximum applied force (see FIG. 2) and A is the projected area of the indentation left in the material's surface. The area A is determined by assuming the indentation has the same geometry as the indentor that formed it, i.e. a Vickers pyramid, and therefore the projected area can be determined from the indent depth given by $d_i$ in FIG. 2.

$$A = 24.5 d_i^2$$

Example 4

Measurement of Contiguity

Contiguity is measured using microstructural images of the ice confection using cryogenic Scanning Electron Microscopy (SEM). Structures are imaged using the technique described in "A low temperature scanning electron microscopy study of ice cream. I. Techniques and general microstructure" Food Structure Vol. 11 (1992), pp 1–9.

In a particulate composite, the Contiguity of the particulate phase is defined as the ratio of the particle to particle interface area divided by the total internal interface area. It is a measure of the degree of network formation of the particulate phase. In ice confections the particles are ice crystals within the matrix and thus contiguity of the ice is defined as;

$$C_{ii} = \frac{A_{ii}}{(A_{ii} + A_{im})}$$

where $C_{ii}$ is the contiguity, $A_{ii}$ is the total interfacial surface area of ice-ice interfaces and $A_{im}$ is the interfacial surface area of ice-matrix interfaces. Contiguity can be measured from microstructural images of random planar surfaces cut through the material. Cryo-SEM images of flat fracture surfaces of unaerated ice confection are sufficient for this.

By placing an array of lines on the image of the microstructure, the number of intercepts of these lines with ice-ice and ice-matrix interfaces are counted and combined in the following equation, to give the contiguity;

$$C_{ii} = \frac{2N_{ii}}{(2N_{ii} + N_{im})}$$

where $N_{ii}$=number per unit length of ice-ice intercepts and $N_{im}$=number per unit length of ice-matrix intercepts.

Ideally, approximately 800 interfaces were counted from a total of 5 images that are representative of each sample's structure.

To determine contiguity, two sets of measurements were taken from each image. After placing a regular set of lines onto the image, the number of intercepts of the ice-matrix and ice-ice interfaces with these lines were counted, only including all obvious ice-ice interfaces. The count was then repeated, but this time with all possible ice-ice interfaces included. As such, a maximum ice contiguity measurement and a minimum ice contiguity measurement was made for each image. The mean of these figures is then taken as the contiguity value.

Example 5

Measurement of Euler-Poincare Characteristic

The Euler-Poincare characteristic is measured using microstructural images of the ice confection using cryogenic Scanning Electron Microscopy (SEM). Structures are imaged using the technique described in "A low temperature scanning electron microscopy study of ice cream. I. Techniques and general microstructure" Food Structure Vol. II (1992), pp 1–9.

In a two-phase composite structure, the degree of continuity of one phase can be measured using the Euler-Poincare characteristic. The lower the value of the Euler-Poincare characteristic for a phase, the more continuous or connected that phase is within the microstructure. The Euler-Poincare characteristic can be a positive or negative number. The definition of the Euler-Poincare characteristic is given in "Unbiased estimation of the Euler-Poincare characteristic" by B. P. Pinnamaneni, C. Lantuejoul, J. P. Jernot and J. L. Chermant, Acta Sterlogica, 1989, 8/2, p101–106.

To measure the Euler-Poincare characteristic for ice in ice confections, identification of the ice and matrix phases on the microstructural images was performed and using an image analysis system, the ice phase Euler-Poincare characteristic was determined using a specifically written analysis program. Whenever contrast in the images was insufficient for the image analysis system to automatically distinguish ice and matrix separately, the interface between the two was identified manually, thus enabling accurate determination of the Euler-Poincare characteristic.

The Euler-Poincare characteristic can be measured for ice in an ice confection which has been produced by any processing route.

Example 6

Aspect Ratio Measurement

Samples were equilibrated at −18° C. in a Prolan environmental cabinet for approximately 12 hours. Microscopic slides were prepared by smearing a thin layer of ice confection from the centre of thin glass plates.

Each slide was transferred to a temperature controlled microscopic stage (at −18° C.) where images of ice crystals (about 400 individual ice crystals) were collected and relayed through a video camera to an image storage and analysis system.

The stored ice crystal images were highlighted manually by drawing around its perimeter which then highlights the whole crystal. Images of the highlighted crystals were then measured using the image analysis software which counts the number of pixels required to complete the longest diameter (length), shortest diameter (breadth), the aspect ratio (length/breadth).

The average aspect ratio for the crystals was calculated.

Example 7

The production of shaped monobite water ice pieces produced in a hollow "hoop" format, having a hard, crunchy texture.

A water ice solution having the following formulation was prepared as follows;

|  | % (weight) |
| --- | --- |
| Fructose | 5.0 |
| Locust Bean Gum | 0.5 |
| Citric Acid | 0.5 |
| Flavours/Colours | 0.5 |
| Type III AFP* | 0.005 |
| Water | to 100 |

*As described in WO 97/02343
Total Solids; 6.4%
Ice Content at −18° C.; 89.4% by weight

Preparation of the Water Ice Mix

All the water ice ingredients except AFP were mixed together using a high shear mixer for approximately 3 minutes. The water being added at a temperature of 80° C. The temperature of the water ice mix was approximately 55–65° C. after mixing.

The AFP was then added, and mixed for approximately 30 seconds in with the hot mix.

The mix was then passed through to a plate heat exchanger for pasteurization at 81° C. for 25 seconds. The mix was then cooled to approximately 4° C. in the plate heat exchanger prior to use.

Preparation of the Water Ice Product

The water ice mix was slush frozen using a Technohoy MF 75 scraped surface heat exchanger. The water ice slush was extruded at approximately −2° C. through a cylindrical shaped nozzle, having an outer diameter of 15 mm and an inner diameter of 11 mm, to form long hollow tubes. Tubes were hardened in a blast freezer at −35° C. then stored at −25° C. Monobites were formed by cutting the hollow tubes into approximately 1–2 cm lengths.

The final monobite product had an external diameter of approximately 20 mm and a water ice thickness of from 2–3 mm.

The products were stable to manufacture, packaging, storage and distribution.

Example 8

Chocolate flavored milk ice flakes, loosely moulded together and coated in chocolate. This provided a product with novel eating properties which is easy and clean to handle.

A milk ice premix having the following formulation was prepared as follows;

|  | % (weight) |
| --- | --- |
| Sucrose | 13.2 |
| 42 DE Corn Syrup | 2.8 |
| Skimmed Milk Powder | 5.0 |
| Whole Milk Powder | 11.2 |
| Stabiliser | 0.27 |
| Emulsifier | 0.2 |
| Cocoa Powder | 4.0 |
| Type III AFP* | 0.005 |
| Water | to 100 |

*as described in WO 97/02343
Total soluble solids; 35.3% by weight
Ice at −18° C.; 52.1% by weight All the milk ice ingredients except the AFP were mixed together using a high shear mixer for approximately 3 minutes. The water being added at a temperature of 80° C. The temperature of the milk ice mix was approximately 55–65° C. after mixing.

The AFP was then added, and mixed for approximately 30 seconds in with the hot mix.

The mix was then homogenized (2000 psi) and passed through to a plate heat exchanger for pasteurization at 81° C. for 25 seconds. The mix was then cooled to approximately 4° C. in the plate heat exchanger prior to use.

The chocolate milk ice premix was frozen by applying a thin layer of approximately 0.5 mm thickness onto a Gerstenberg and Agger pilot scale drum freezer, operating at a rotational speed of 5 rpm. The drum surface, having an area of 0.2 m², was cooled to −25° C. by means of a circulating aqueous methanol coolant. After one complete revolution of the drum (approximately 12 seconds), the frozen layer was scraped off the surface using a metal blade and the flaked milk ice collected. The individual flakes produced were from 0.5 to 1 mm thick, 10 to 150 mm long and 1 to 10 mm wide. The flakes were then loosely moulded into a roll approximately 15 cm long and from 1 to 3 cm in diameter using silicon paper. The moulded flakes were then hardened in a blast freezer operating at approximately −35° C., then stored at −25° C. The moulded flake roll was then dipped or enrobed in chocolate.

Examples 9 to 12

An ice cream composition was prepared having the following formulation;

|  | weight % |
| --- | --- |
| Sucrose | 13.000 |
| Skimmed Milk Powder | 10.000 |
| Butter fat | 8.000 |
| Maltodextrin 40 | 4.000 |
| Monoglycerol Palmitate (MGP) | 0.300 |
| Locust Bean Gum | 0.144 |
| Carageenan L100 | 0.016 |
| Flavour | 0.012 |
| Water | to 100 |

Total Soluble solids; 35% by weight
Ice content at −18° C.; 54% by weight

All the ice cream ingredients were mixed together using a high shear mixer for approximately 3 minutes. The water being added at a temperature of 80° C. The temperature of the water ice mix was approximately 55–65° C. after mixing.

The mix was then homogenized (2000 psi) and passed through to a plate heat exchanger for pasteurization at 81° C. for 25 seconds. The mix was then cooled to approximately 4° C. in the plate heat exchanger prior to use.

After pasteurisation Type III AFP (as described in WO 97/02343) was added to the ice cream pre-mix in the following concentrations;

Example 9—0.0005% by weight
Example 10—0.0025% by weight
Example 11—0.005% by weight
Example 12—0.001% by weight The ice cream pre-mix was then frozen using a Technohoy MF 75 scraped surface heat exchanger, no overrun was introduced into the ice cream. The ice cream was extruded at a temperature of from −4.3° C. to −4.6° C. The product was then hardened in a blast freezer at −35° C., then stored at −25° C.

The apparent elastic modulus and the flexure were determined using a four point bend test as described in Example 1.

Figure 3:
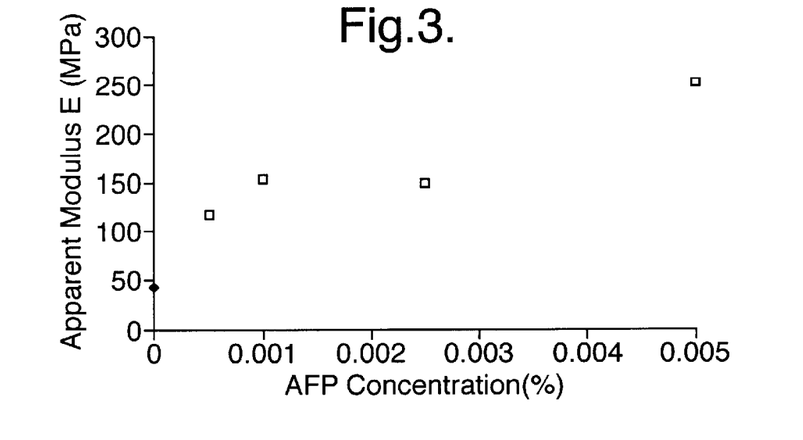
FIG. 3 shows a comparison of the apparent modulus measured for Examples 9 to 12 compared to a control sample.
Figure 4:
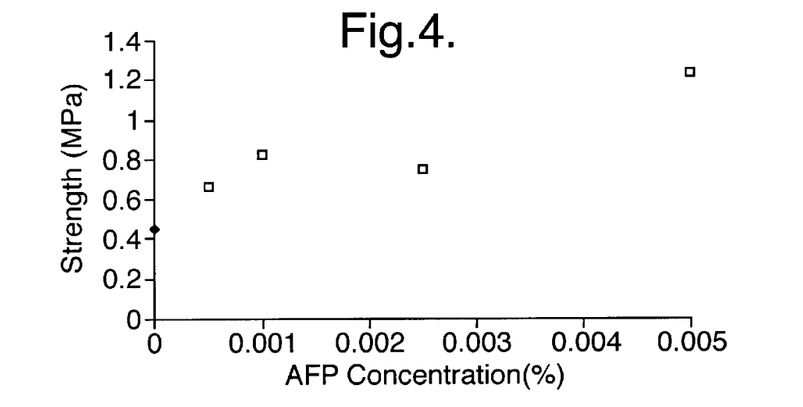
FIG. 4 shows a comparison of the flexure strength measured for Examples 9 to 12 compared to a control sample.

Results were compared with a control sample containing no AFP. Results are shown in FIGS. 3 and 4 where AEP containing examples are shown by (□) and control samples containing no AFP are shown by (◆).

Δ modulus, Δ modulus/original modulus, Δ strength and Δ strength/original strength were calculated. Results are shown in Table 1.

Figure 5:
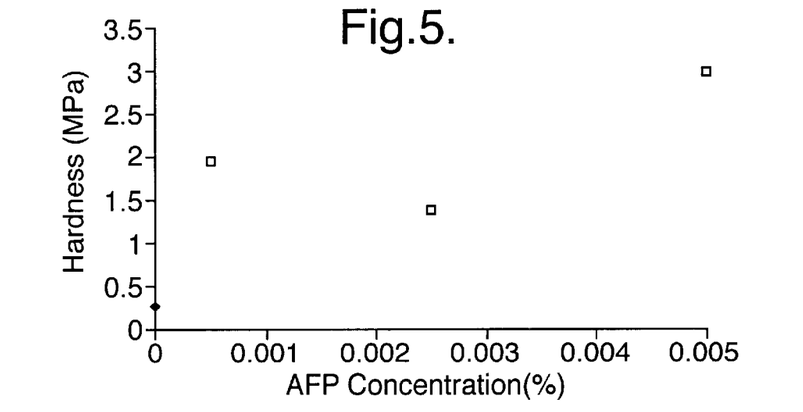
FIG. 5 shows a comparison of the Vickers Hardness measured for Examples 9 to 12 compared to a control sample.

The Vickers Hardness was also determined using the method given in Example 3 results are shown in FIG. 5 where AFP containing examples are shown by (□) and control samples containing no AFP are shown by (◆)

$\Delta H_v / H_{v\ orig}$ and $\Delta H_v$ were calculated. Results are shown in Table 1.

TABLE 1

| Example | ΔE (MPa) | ΔE/ $E_{orig}$ | Δσ$_u$ (MPa) | Δσ$_u$/ σ$_{u\ orig}$ | ΔH$_v$ (Mpa) | ΔH$_v$/ H$_{v\ orig}$ |
|---|---|---|---|---|---|---|
| 9 | 7.3 | 1.7 | 0.2 | 0.5 | 1.65 | 6.2 |
| 10 | 104.8 | 2.46 | 0.3 | 0.67 | 1.25 | 9.02 |
| 11 | 208.3 | 4.9 | 0.8 | 1.76 | 2.7 | 10.2 |
| 12 | 109.6 | 2.58 | 0.37 | 0.822 | | |

Unaerated ice cream of Examples 9 to 12 may be used to provide thin, unsupported, discrete pieces such as hoops as provided by Example 7 and flakes as provided by Example 8.

Example 13

Comparative Examples A to C

An ice cream pre-mix having the formulation of Example 10 was prepared as described for Example 10 the pre-mix was then frozen as described for Example 10 with the following overruns (volume fraction of air ($V_{air}$)).

Example 13 —No overrun (0)
Comparative Example A—43% overrun (0.3)
Comparative Example B—67% overrun (0.4)
Comparative Example C—100% overrun (0.5)

The apparent elastic modulus and the flexure strength were determined using a four point bend test as described in Example 1.

Figure 6:
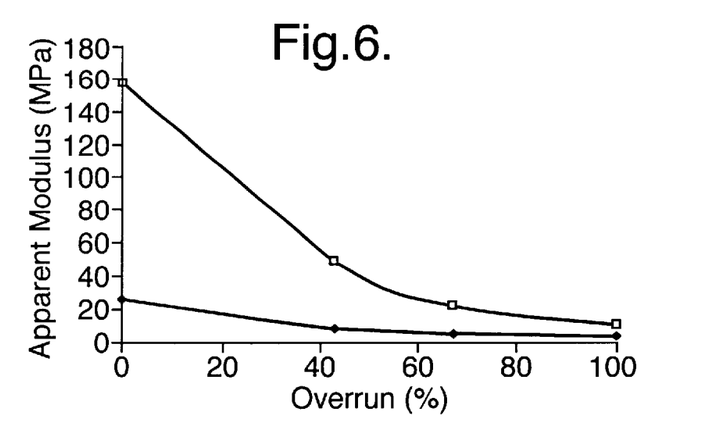
FIG. 6 shows a comparison of the apparent modulus measured for Example 13 compared to Comparative Examples A, B, & C and relevant control samples.
Figure 7:
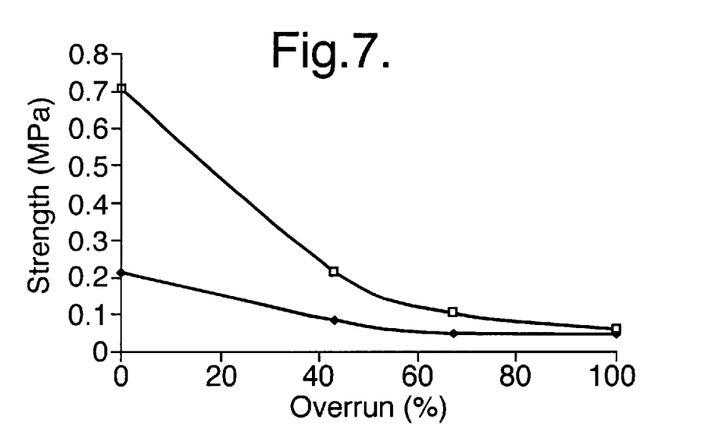
FIG. 7 shows a comparison of the flexure strength measured for Example 13 compared to Comparative Examples A, B, & C and relevant control samples.

Results were compared with relevant control samples containing no AFP. Results are shown in FIGS. 6 and 7 where AFP containing examples are shown by (□) and control samples containing no AFP are shown by (◆)

Δ modulus, Δ modulus/original modulus, Δ strength and Δ strength/original strength were calculated. Results are shown in Table 2.

Figure 8:
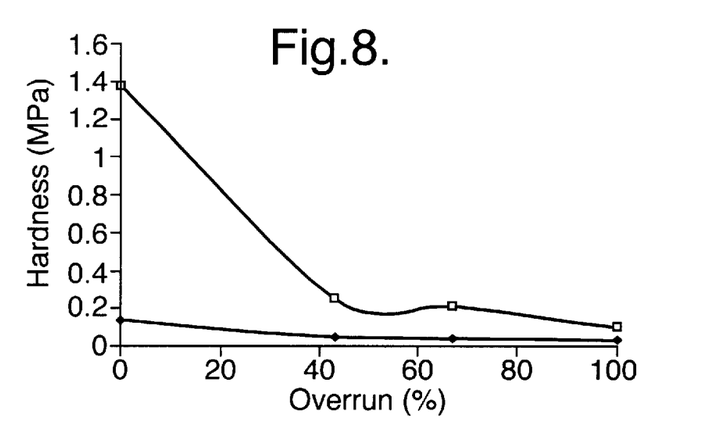
FIG. 8 shows a comparison of the Vickers Hardness measured for Example 13 compared to Comparative Examples A, B, & C and relevant control samples.

The Vickers Hardness was also determined using the method given in Example 3 results are shown in FIG. 8 where AFP containing examples are shown by (□) and control samples containing no AFP are shown by (◆)

$\Delta H_v / H_{v\ orig}$ and $\Delta H_v$ were calculated. Results are shown in Table 2.

TABLE 2

| Example | ΔE (MPa) | ΔE/ $E_{orig}$ | Δσ$_u$ (MPa) | Δσ$_u$/ σ$_{u\ orig}$ | ΔH$_v$ (Mpa) | ΔH$_v$/ H$_{v\ orig}$ |
|---|---|---|---|---|---|---|
| 13 | 132 | 5.1 | 0.5 | 2.3 | 1.25 | 8.9 |
| A | 40 | 4.7 | 0.1 | 1.5 | 0.2 | 4.0 |
| B | 17 | 3.3 | 0.05 | 1.1 | 0.15 | 4.3 |
| C | 6.6 | 1.6 | 0.02 | 0.4 | 0.05 | 2.1 |

Unaerated ice cream of Example 13 can be used to manufacture thin, unsupported, discrete pieces such as hoops as described in Example 7, and flakes as described in Example 8. However, thin, unsupported, discrete pieces manufactured using ice cream of comparative Examples A to C were not self-supporting and collapsed during storage and distribution.

Examples 14–17

A water ice solution having the following composition was prepared as follows;

| | Weight % |
|---|---|
| Sucrose | 20.0 |
| Locust Bean Gum | 0.2 |
| Water | to 100 |
| Total soluble solids; | 20.2% by weight |
| Ice content at −18° C.; | 70% by weight |

The water ice solution was prepared as follows;

All the water ice ingredients except AFP were mixed together using a high shear mixer for approximately 3 minutes. The water being added at a temperature of 80° C. The temperature of the water ice mix was approximately 55–65° C. after mixing.

The mix was then passed through to a plate heat exchanger for pasteurization at 81° C. for 25 seconds. The mix was then cooled to approximately 4° C. in the plate heat exchanger prior to use.

After pasteurisation Type III AFP (as described in WO 97/02343) was added to the water ice solution in the following concentrations;

Example 14—0.0005%
Example 15—0.0011%
Example 16—0.0025%
Example 17—0.005%

The water ice solution was frozen in a Technohoy MF 75 scraped surface heat exchanger with no overrun being introduced. The water ice was extruded at a temperature of from −3.9° C. to −5.6° C. The product was then hardened in a blast freezer at −35° C., then stored at −25° C.

The apparent elastic modulus and the flexure strength were determined using a four point bend test as described in Example 1.

Figure 9:
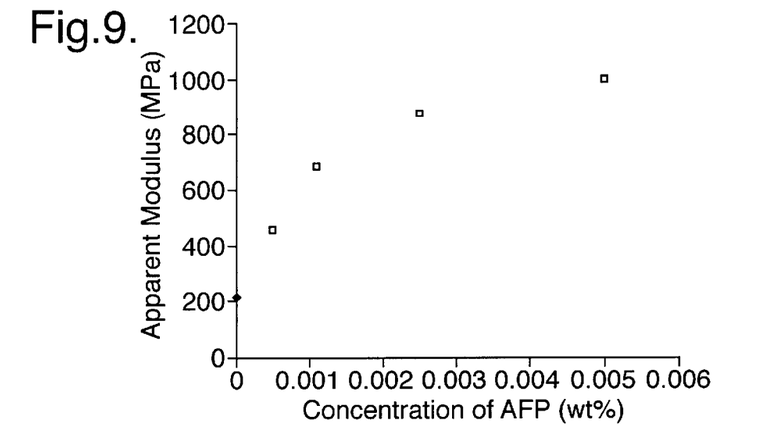
FIG. 9 shows a comparison of the apparent modulus measured for Examples 14 to 17 compared with a control sample.
Figure 10:
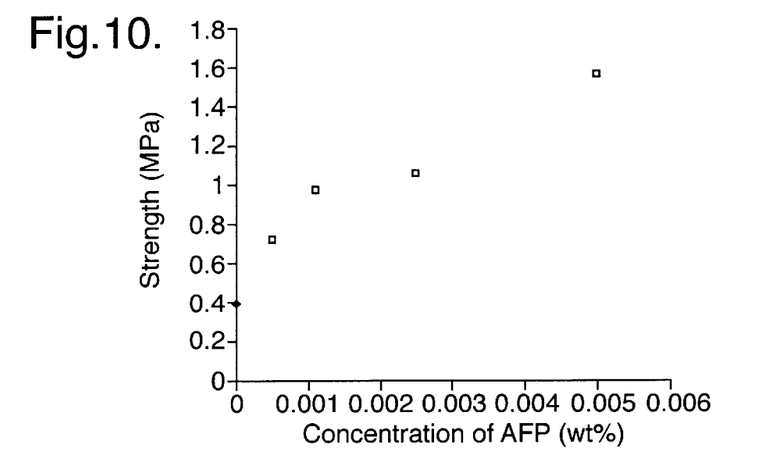
FIG. 10 shows a comparison of the flexure strength measured for Examples 14 to 17 compared with a control sample.

Results were compared with a control sample containing no AFP. Results are shown in FIGS. 9 and 10 where AFP containing examples are shown by (□) and control samples containing no AFP are shown by (◆)

Δ modulus, Δ modulus/original modulus, Δ strength and Δ strength/original strength were calculated. Results are shown in Table 3.

Figure 11:
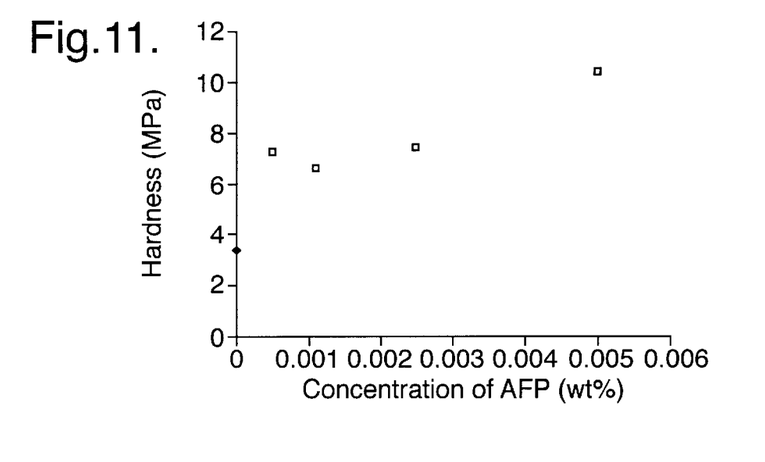
FIG. 11 shows a comparison of the Vickers Hardness measured for Examples 14 to 17 compared with a control sample.

The Vickers Hardness was also determined using the method given in Example 3 results are shown in FIG. 11 where AFP containing examples are shown by (□) and control samples containing no AFP are shown by (♦)

$\Delta H_v/H_{v\ orig}$ and $\Delta H_v$ were calculated. Results are shown in Table 3.

TABLE 3

| Example | $\Delta E$ (Mpa) | $\Delta E/E_{orig}$ | $\Delta \sigma_u$ (MPa) | $\Delta \sigma_u/\sigma_{u\ orig}$ | $\Delta H_v$ (Mpa) | $\Delta H_v/H_{v\ orig}$ |
|---|---|---|---|---|---|---|
| 14 | 243 | 1.14 | 0.3 | 0.8 | 3.8 | 1.12 |
| 15 | 471 | 2.2 | 0.6 | 1.5 | 3.2 | 0.9 |
| 16 | 662 | 3.1 | 0.7 | 1.7 | 4.0 | 1.2 |
| 17 | 785 | 3.7 | 1.2 | 3.0 | 7.0 | 2.0 |

Water ice compositions of Examples 14–17 may be used to manufacture thin, unsupported, discrete pieces such as hoops as described in Example 7 and flakes as described in Example 8.

Examples 18–21

A water ice solution having the following composition was prepared as in Examples 14–17;

| | Weight % |
|---|---|
| Sucrose | 20.0 |
| Locust Bean Gum | 0.2 |
| Water | to 100 |

Total soluble solids; 20.2% by weight
Ice content at −18° C.; 70% by weight

After pasteurisation Type III AFP (as described in WO 97/02343) was added to the water ice solution in the following concentrations;

Example 18—0.0005%
Example 19—0.0011%
Example 20—0.0025%
Example 21—0.005%

The water ice solution was then quiescently frozen. The water ice solution was poured into the split metal moulds used for the production of mechanical test pieces (see example 1). They were then placed in the cold store overnight to freeze quiescently at a temperature of −25° C. The next day, the test bars were demoulded, placed in polythene bags and stored at −25° C. until the day prior to mechanical testing.

The apparent elastic modulus and the flexure strength were determined using a four point bend test as described in Example 1.

Figure 12:
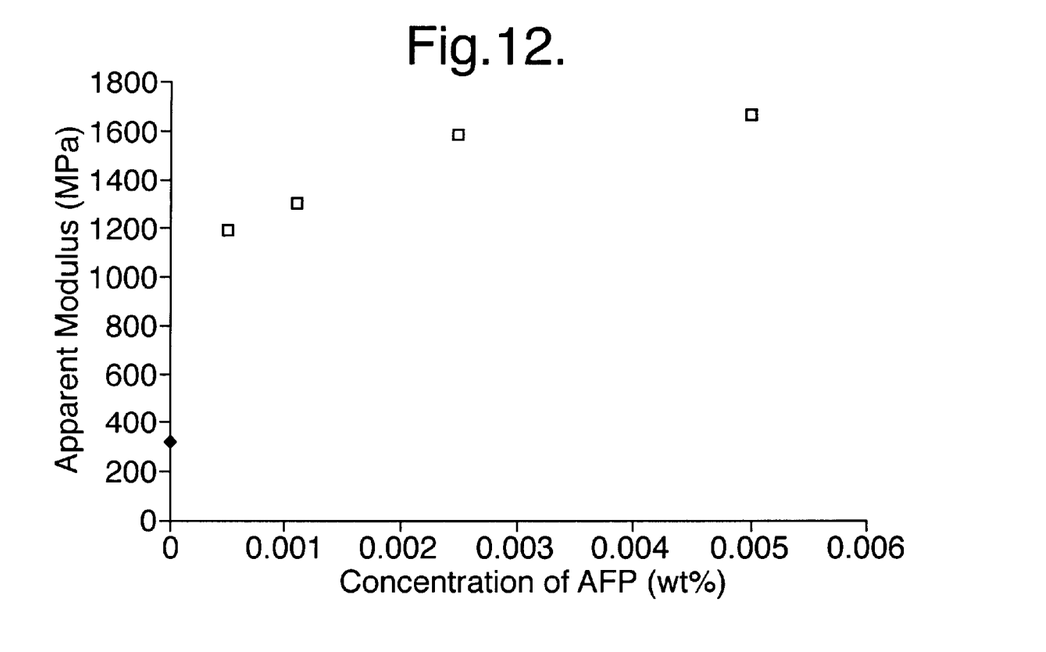
FIG. 12 shows a comparison of the apparent modulus measured for Examples 18 to 21 compared with a control sample.
Figure 13:
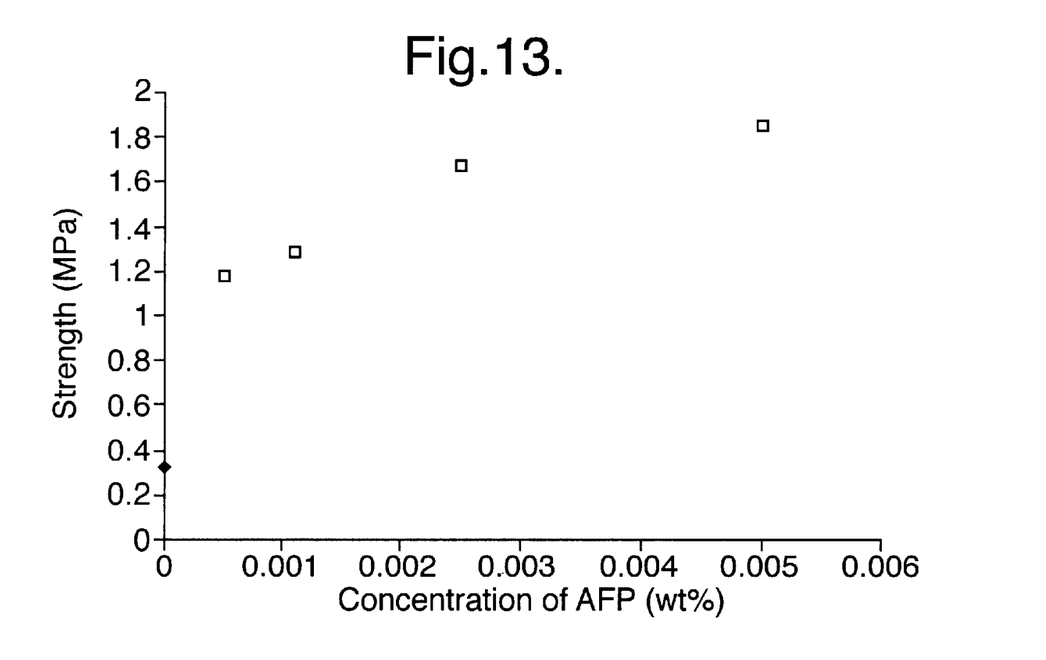
FIG. 13 shows a comparison of the flexure strength measured for Example 18 to 21 compared with a control sample.

Results were compared with a control sample containing no AFP. Results are shown in FIGS. 12 and 13 where AFP containing examples are shown by (□) and control samples containing no AFP are shown by (♦)

Δ modulus, Δ modulus/original modulus, Δ strength and Δ strength/original strength were calculated. Results are shown in Table 4.

TABLE 4

| Example | $\Delta E$ (MPa) | $\Delta E/E_{orig}$ | $\Delta \sigma_u$ (MPa) | $\Delta \sigma_u/\sigma_{u\ orig}$ |
|---|---|---|---|---|
| 18 | 871 | 2.7 | 0.85 | 2.7 |
| 19 | 985 | 3.1 | 0.96 | 3.0 |
| 20 | 1269 | 4.0 | 1.4 | 4.2 |
| 21 | 1347 | 4.2 | 1.5 | 4.8 |

Examples 22 & 23

Comparative Example D

An ice cream composition was prepared having the following formulation;

| | weight % |
|---|---|
| Sucrose | 13.000 |
| Skimmed Milk Powder | 10.000 |
| Butter fat | 8.000 |
| Maltodextrin 40 | 4.000 |
| MGP | 0.300 |
| Locust Bean Gum | 0.144 |
| Carageenan L100 | 0.016 |
| Flavour | 0.012 |
| Water | to 100 |

Total Soluble solids; 35% by weight
Ice content at −18° C.; 54% by weight

All the ice cream ingredients were mixed together using a high shear mixer for approximately 3 minutes. The water being added at a temperature of 80° C. The temperature of the water ice mix was approximately 55–65° C. after mixing. The mix was then homogenized (2000 psi) and passed through to a plate heat exchanger for pasteurization at 81° C. for 25 seconds. The mix was then cooled to approximately 4° C. in the plate heat exchanger prior to use.

After pasteurisation Type III AFP (as described in WO 97/02343) was added to the ice cream pre-mix in the following concentrations;

Example 22—0.0005% by weight
Example 23—0.005% by weight
Comparative Example D—no AFP The ice cream pre-mix was then frozen using a Technohoy MF 75 scraped surface heat exchanger, no overrun was introduced into the ice cream. The ice cream was extruded at a temperature of from −4.4 to −5.4° C. The product was then hardened in a blast freezer at −35° C., then stored at −25° C.

Contiguity was measured as in Example 4.
Results are shown in Table 5

TABLE 5

| Example | Contiguity |
|---|---|
| 22 | 0.2 |
| 23 | 0.3 |
| D | 0.1 |

Examples 24 & 25

Comparative Example E

A water ice solution having the following composition was prepared as follows;

|  | Weight % |
|---|---|
| Sucrose | 20.0 |
| Locust Bean Gum | 0.2 |
| Water | to 100 |

Total soluble solids; 20.2% by weight
Ice content at −18° C.; 70% by weight

The water ice solution was prepared as in Example 12. After pasteurisation Type III AFP (as described in WO 97/02343) was added to the water ice solution in the following concentrations;

Example 24—0.0005% by weight

Example 25—0.005% by weight

Comparative Example E—no AFP

The water ice solution was frozen in a Technohoy MF 75 scraped surface heat exchanger with no overrun being introduced. The water ice was extruded at a temperature of from −3.9° C. to −5.6° C. The product was then hardened in a blast freezer at −35° C., then stored at −25° C.

Contiguity was measured as in Example 4.

Results are shown in Table 6

TABLE 6

| Example | Contiguity |
|---|---|
| 24 | 0.24 |
| 25 | 0.22 |
| E | 0.11 |

Example 26

Comparative Example F

An ice cream composition was prepared having the following formulation;

|  | Weight % |
|---|---|
| Sucrose | 13.000 |
| Skimmed Milk Powder | 10.000 |
| Butter fat | 8.000 |
| Maltodextrin 40 | 4.000 |
| MGP | 0.300 |
| Locust Bean Gum | 0.144 |
| Carageenan L100 | 0.016 |
| Flavour | 0.012 |
| Water | to 100 |

Total soluble solids; 35% by weight
Ice content at −18° C.

All the Ice cream ingredients were mixed together using a high shear mixer for approximately 3 minutes. The water was added at a temperature of 80° C. The temperature of the water ice mix was approximately 55–65° C. after mixing.

The mix was then homogenized (2000 psi) and passed through to a plate heat exchanger for pasteurization at 81° C. for 25 seconds. The mix was then cooled to approximately 4° C. in the plate heat exchanger prior to use.

After pasteurisation Type III AFP (as described in WO 97/02343) was added to the ice cream pre-mix in the following concentrations;

Example 26—0.005% by weight

Comparative Example F—no AFP

The ice cream pre-mix was then frozen using a Technohoy MF 75 scraped surface heat exchanger, no overrun was introduced into the ice cream. The ice cream was extruded at a temperature of from −4.4 to −5.4° C. The product was then hardened in a blast freezer at −35° C., then stored at −25° C.

The Euler-Poincare characteristic was measured as in Example 5.

Results are shown in Table 7

TABLE 7

| Example | Euler-Poincare characteristic (mm$^{-2}$) |
|---|---|
| 26 | −577 |
| E | 339 |

Example 27

Comparative Example G

A water ice solution having the following composition was prepared as follows;

|  | Weight % |
|---|---|
| Sucrose | 20.0 |
| Locust Bean Gum | 0.2 |
| Water | to 100 |

Total soluble solids; 20.2% by weight
Ice content at −18° C.; 70% by weight

The water ice solution was prepared as in Example 12. After pasteurisation Type III AFP (as described in WO 97/02343) was added to the water ice solution in the following concentrations;

Example 27—0.005% by weight

Comparative Example G—no AFP

The water ice solution was frozen quiescently as described in Example 21 with no overrun being introduced.

The Euler-Poincare characteristic was measured as in Example 5.

Results are shown in Table 8

TABLE 8

| Example | Euler-Poincare characteristics (mm$^{-2}$) |
|---|---|
| 27 | −383 |
| G | 4.3 |

Example 28

A milk solution having the following composition was prepared as follows;

| | % (w/w) |
|---|---|
| Sucrose | 13.2 |
| Corn Syrup | 2.8 |
| Whole Milk Powder | 11.2 |
| Skimmed Milk Powder | 5.0 |
| Stabiliser | 0.27 |
| Emulsifier | 0.20 |
| Colour/Flavour | 0.06 |
| AFP* | 0.005 |
| Water | to 100 |

*as described in WO 97/02343

All the milk ice ingredients except AFP were mixed together using a high shear mixer for approximately 3 minutes. The water was added at a temperature of 80° C. The temperature of the milk ice mix was approximately 55–65° C. after mixing.

The mix was then homogenized (2000 psi) and passed through to a plate heat exchanger for pasteurisation at 81° C. for 25 seconds. The mix was then cooled to approximately 4° C. in the plate heat exchanger prior to use.

The mix was then portioned into two halves, and Type III AFP (as described in WO 97/02343) was added to one half.

The milk ice solutions were then quiescently frozen. The milk ice solution was poured into the split metal moulds used for the production of mechanical test pieces (see example 1). They were then placed in the cold store overnight to freeze quiescently at a temperature at −25° C. The next day, the test bars were demoulded, placed in polythene bags and stored at −25° C. until the day prior to mechanical testing.

The apparent elastic modulus and the flexure strength were determined using a four point bend test as described in Example 1.

Results for the milk ice containing AFP were compared with the control sample containing no AFP.

Δ modulus, Δ modulus/original modulus, Δ strength and Δ strength/original strength were calculated. Results are shown in Table 9.

TABLE 9

| Example | $\Delta E$ (MPa) | $\Delta E/E_{orig}$ | $\Delta\sigma_u$ (MPa) | $\Delta\sigma_u/\sigma_{u\ orig}$ |
|---|---|---|---|---|
| 28 | 756 | 16.2 | 1.31 | 6.68 |

Example 29

A milk ice solution having the following composition was prepared as follows;

| | % (w/w) |
|---|---|
| Sucrose | 13.2 |
| Corn Syrup | 2.8 |
| Whole Milk Powder | 11.2 |
| Skimmed Milk Powder | 5.0 |
| Stabiliser | 0.27 |
| Emulsifier | 0.20 |
| Colour/Flavour | 0.06 |
| AFP* | 0.005 |
| Water | to 100 |

*as described in WO 97/02343

All the milk ice ingredients except AFP were mixed together using a high shear mixer for approximately 3 minutes. The water was added at a temperature of 80° C. The temperature of the milk ice mix was approximately 55–65° C. after mixing.

The mix was then homogenized (2000 psi) and passed through to a plate heat exchanger for pasteurisation at 81° C. for 25 seconds. The mix was then cooled to approximately 4° C. in the plate heat exchanger prior to use.

The mix was then portioned into two halves, and Type III AFP (as described in WO 97/02343) was added to one half.

The milk ice solutions were frozen in a Technohoy MF 75 scraped surface heat exchanger with no overrun being introduced. The water ice was extruded at a temperature of from −3.9° C. to −5.6° C. The product was then hardened in a blast freezer at −35° C., then stored at −25° C.

The apparent elastic modulus and the flexure strength were determined using a four point bend test as described in Example 1.

Results for the milk ice containing AFP were compared with the control sample containing no AFP.

Δ modulus, Δ modulus/original modulus, Δ strength and Δ strength/original strength were calculated. Results are shown in Table 10.

TABLE 10

| Example | $\Delta E$ (MPa) | $\Delta E/E_{orig}$ | $\Delta\sigma_u$ (MPa) | $\Delta\sigma_u/\sigma_{u\ orig}$ |
|---|---|---|---|---|
| 29 | 290 | 5.08 | 0.968 | 4.17 |

Example 30

Hollow loop shaped monobite water ice pieces were produced as detailed in Example 7.

Variants with and without type III AFP were produced. The hoops produced without type III AFP did not have a crunchy brittle texture, and could easily be deformed and broken in the hand.

Samples of each were placed on a stainless steel mesh grid in a temperature controlled environment (temperature=+24° C.). The weight loss of the samples against time, as the sample melts and drips though the grid, was measured. Mean values of 3 replicates were taken for both of the samples under investigation. Results are shown in Table 11.

TABLE 11

| Time (min) | Wt Loss Control (%) | Wt Loss + AFP (%) | Mass Loss Control (g) | Mass Loss + AFP (g) |
|---|---|---|---|---|
| 4 | 0.4 | 0.0 | 0.06 | 0.00 |
| 5 | 4.4 | 0.0 | 0.60 | 0.00 |

TABLE 11-continued

| Time (min) | Wt Loss Control (%) | Wt Loss + AFP (%) | Mass Loss Control (g) | Mass Loss + AFP (g) |
|---|---|---|---|---|
| 6 | 7.0 | 0.0 | 0.96 | 0.00 |
| 7 | 9.2 | 0.0 | 1.26 | 0.00 |
| 8 | 10.2 | 0.0 | 1.40 | 0.00 |
| 9 | 10.6 | 0.0 | 1.45 | 0.00 |
| 10 | 10.8 | 0.0 | 1.48 | 0.00 |
| 11 | 11.6 | 0.4 | 1.59 | 0.05 |
| 12 | 13.0 | 1.4 | 1.79 | 0.19 |
| 13 | 14.1 | 4.0 | 1.94 | 0.54 |
| 14 | 16.0 | 6.2 | 2.19 | 0.85 |
| 15 | 17.1 | 10.8 | 2.35 | 1.48 |

From the data, it can be seen that the melting behaviour of the control and the AFP products are different. The first drip of the control product is seen after 4 minutes whilst the AFP-containing product needs more than 10 minutes. The control products start to lose their structural integrity almost instantly, whilst the AFP-containing product remains as an in-act hollow loop until it melts.

Example 31

Methodology for measuring the mechanical properties of thin ice layers.

The mechanical properties were determined using a three point bend test.

The three point bend test can be used to determine a number of mechanical properties of ice confection materials. The mechanical properties being measured are Young's modulus (apparent) and flexure strength.

In a bend test, a test piece is deformed whilst measuring the applied force and test piece deflection. A schematic data set for an ice confection is shown in FIG. 1. The apparent elastic modulus is determined by the gradient of the initial linear part of this curve.

The 3-point bend test requires production of a parallel sided rectangular bar of ice confection material. This may be obtained by any suitable means.

In this particular application the parallel sided rectangular bar of ice confection was made using silicone rubber moulds to produce strips of ice confection having the dimensions 70×10×2 mm.

The moulds were slightly over filled with mix and a temperature controlled plate (set at −30° C.) lowered onto the mould to rest across the width and freeze the mix through the depth. Samples were then equilibrated to −20° C. before being cut to a length of 50 mm. Such 50 mm lengths of ice confection were then equilibrated to −18° C. overnight before being analysed as described below.

The test is described in "Biomechanics Materials. A practical Approach" Ed. J. F. V Vincent, Pub. IRL Press, Oxford University Press, Walton Street, Oxford, 1992. Testing involves placing each bar onto 2 supports and bending it until fracture by applying pressure from a third support, centrally on the bar's top surface. The force applied in bending and the displacement of the moving contact are recorded throughout the test. The speed of descent of the moving support was 10 mm per minute.

The apparent elastic modulus of the material is given by the equation;

$$E = \frac{gradient \cdot S^3}{4BD^3}$$

where the gradient is that shown in FIG. 1, S is the span (distance) between the supporting contacts beneath the test bar, B is the width of the bar and d is the depth of the bar.

For these tests the span was 30 mm.

With reference to FIG. 1, The strength of a material under three point bend conditions is given as;

$$\sigma_u = \frac{3F_{max}S}{2BD^2}$$

where $\sigma_u$ is the flexure strength and $F_{max}$ is the maximum force recorded.

Example 32

A water ice solution having the following composition was prepared;

| | % w/w |
|---|---|
| Sucrose | 5 |
| Locust Bean Gum | 0.2 |
| AFP* | 0.005 |
| Water | to 100 |

*As described in WO 97/02343
Total soluble solids; 5% by weight
Ice content at −18° C.; 92% by weight The water ice solution was prepared as follows;

All the water ice ingredients except AFP were mixed together using a high shear mixer for approximately 3 minutes. The water being added at a temperature of 80° C. The temperature of the water ice mix was approximately 55 to 65° C. after mixing.

The mix was cooled to approximately 4° C. in a brine bath.

After cooling Type III AFP (as described in WO 97/02343) was added to the water ice solution.

Thin water ice layers were then manufactured as detailed in Example 31 and then apparent elastic modulus and the flexure strength were determined using the test as described in Example 31.

Results were compared with a Control Sample containing no AFP.

Δ modulus, Δ modulus/original modulus, Δ strength and Δ strength/original strength were calculated. Results are shown in Table 12.

TABLE 12

| Example | ΔE (MPa) | ΔE/E$_{orig}$ | Δσ$_u$ (MPa) | Δσ$_u$/σ$_{u\ orig}$ |
|---|---|---|---|---|
| 32 | 1224 | 1.6 | 2.3 | 1.6 |

Example 33

Example 32 was repeated except that the following water ice solution was prepared;

|  | % w/w |
| --- | --- |
| Sucrose | 20 |
| LBG | 0.2 |
| AFP* | 0.005 |
| Water | to 100 |

*as described in WO 97/02343
Total soluble solids; 20.2% by weight
Ice content at −18° C. 70% by weight Results are shown in Table 13

TABLE 13

| Example | ΔE (MPa) | ΔE/ E$_{orig}$ | Δσ$_u$ (MPa) | Δσ$_u$/ σ$_{u\ orig}$ |
| --- | --- | --- | --- | --- |
| 33 | 1121 | 5.2 | 2.2 | 2.8 |

Example 34

A water ice solution having the following composition was prepared as given in Example 17.

|  | % w/w |
| --- | --- |
| Sucrose | 10.0 |
| Glucose | 5.0 |
| LBG | 0.2 |
| Citric Acid | 0.5 |
| AFP* | 0.005 |
| Colour/Flavour | 0.2 |
| Water | to 100 |

*as described in WO 97/02343

Thin water ice layers were then manufactured as detailed in Example 31 and the apparent elastic modulus and the flexure strength were determined using the test as described in Example 31.

Results were compared with a Control Sample containing no AFP.

Δ modulus, Δ modulus/original modulus, Δ strength and Δ strength/original strength were calculated. Results are shown in Table 14.

TABLE 14

| Example | ΔE (MPa) | ΔE/ E$_{orig}$ | Δσ$_u$ (MPa) | Δσ$_u$/ σ$_{u\ orig}$ |
| --- | --- | --- | --- | --- |
| 34 | 1936 | 3.3 | 3.1 | 6.9 |

Example 35

Example 34 was repeated except using a milk ice composition having the following formulation;

|  | % w/w |
| --- | --- |
| Fructose | 5.0 |
| LBG | 0.5 |
| Citric Acid | 0.5 |
| Colours/flavours | 0.2 |
| AFP* | 0.005 |
| Water | to 100 |

*as described in WO 97/02343

Results are shown in Table 15

TABLE 15

| Example | ΔE (MPa) | ΔE/ E$_{orig}$ | Δσ$_u$ (MPa) | Δσ$_u$/ σ$_{u\ orig}$ |
| --- | --- | --- | --- | --- |
| 35 | 111 | 1.4 | 0.6 | 0.95 |

Example 36

An ice cream composition was prepared having the following formulation;

|  | weight % |
| --- | --- |
| Sucrose | 13.500 |
| Skimmed Milk Concentrate (30% solids) | 24.000 |
| Cream (40% fat) | 43.000 |
| Egg Yolk (unsweetened) | 4.500 |
| Vanilla flavour | 1.000 |
| Water | to 100 |

Total Soluble solids; 45% by weight
Ice content at −18° C.; 46% by weight

All the ice cream ingredients were mixed together using a high shear mixer for approximately 3 minutes. The water being added at a temperature of 80° C. The temperature of the ice cream mix was approximately 38–45° C. after mixing.

The mix was then homogenized (2000 psi) and passed through to a plate heat exchanger for pasteurization at 81° C. for 25 seconds. The mix was then cooled to approximately 4° C. in the plate heat exchanger prior to use.

After pasteurisation Type I AFP (from AF Protein) was added to the ice cream pre-mix in the following concentration;

Example 36—0.001% by weight

The ice cream pre-mix was then frozen using a Technohoy MF 75 scraped surface heat exchanger with no overrun being introduced. The ice cream was extruded at a temperature of from −4.8° C. to −5.5° C. The product was then hardened in a blast freezer at −35° C., then stored at −25° C.

The apparent elastic modulus and the flexure strength were determined using a four point bend test as described in Example 1.

Results were compared with relevant control sample containing no AFP.

Δ modulus, Δ modulus/original modulus, Δ strength and Δ strength/original strength were calculated.
Results are shown in Table 16.

TABLE 16

| Example | ΔE (MPa) | ΔE/E$_{orig}$ | Δσ$_u$ (MPa) | Δσ$_u$/σ$_{u\ orig}$ |
|---|---|---|---|---|
| 36 | 138 | 4.2 | 0.408 | 1.09 |

Example 37

A water ice solution having the following composition was prepared as follows;

| | % by weight |
|---|---|
| Sucrose | 18 |
| Locust Bean Gum | 0.18 |
| Hydrolysed milk protein (Hyfoama DS**) | 0.1 |
| Grass AFP solution* | 30.0 |
| water | to 100 |

*as described in WO 98/04699. The amount of grass AFP solution used was determined by the minimum amount required to provide the recrystallisation inhibition as defined by Example 2.
**Hyfoama DS is a Trademark of Quest International.
Total soluble solids; 18% by weight
Ice Content at −18° C.; 73% by weight A control mix was made without AFP, the grass AFP solution being replaced by 30% by weight water.

All the water ice ingredients except AFP were mixed together using a high shear mixer for approximately 3 minutes. The water being added at a temperature of 80° C. The temperature of the water ice mix was approximately 55–65° C. after mixing.

The mix was then passed through to a plate heat exchanger for pasteurization at 81° C. for 25 seconds. The mix was then cooled to approximately 4° C. in the plate heat exchanger prior to use.

The AFP was added after pasteurisation.

The water ice solution was frozen in a Technohoy MF 75 scraped surface heat exchanger with no overrun introduced The water ice was extruded at a temperature of from −2.6° C. to −3.6° C. The product was then hardened in a blast freezer at −35° C., then stored at −25° C.

The apparent elastic modulus and the flexure strength were determined using a four point bend test as described in Example 1.

Results were compared with the control sample containing no AFP.

Δ modulus, Δ modulus/original modulus, Δ strength and Δ strength/original strength, were calculated. Results are shown in Table 17.

Example 38

A water ice solution having the following composition was prepared as follows;

A control mix was made without AFP, the grass AFP solution being replaced by 30% by weight water.

All the water ice ingredients except AFP were mixed together using a high shear mixer for approximately 3 minutes. The water being added at a temperature of 80° C. The temperature of the water ice mix was approximately 55–65° C. after mixing.

The mix was then passed through to a plate heat exchanger for pasteurization at 81° C. for 25 seconds. The mix was then cooled to approximately 4° C. in the plate heat exchanger prior to use.

After pasteurisation the AFP solution was added to the water ice solution.

The water ice solution was then quiescently frozen. The water ice solution was poured into the split metal moulds used for the production of mechanical test pieces (see example 1). They were then placed in the cold store overnight to freeze quiescently at a temperature of −25° C. The next day, the test bars were demoulded, placed in polythene bags and stored at −25° C. until the day prior to mechanical testing.

The apparent elastic modulus was determined using a four point bend test as described in Example 1.

Results were compared with the control sample containing no AFP.

Δ modulus and Δ modulus/original modulus were calculated. Results are shown in Table 18.

What is claimed is:

1. An unaerated ice confection in the form of thin, unsupported, discrete pieces which are stable during packaging, storage and distribution wherein the ice confection comprises an antifreeze protein and has the following mechanical properties;

Δ modulus/original modulus≧0.4, and/or

Δ strength/original strength≧0.4;

providing that when Δ modulus/original modulus≦6.0,

Δ modulus≧50 MPa, and/or when

Δ strength/original strength≦2.0,

Δ strength≧0.2 MPa.

2. An ice confection according to claim 1, wherein ΔH$_v$/H$_{vorig}$≧0.3, providing that when ΔH$_v$/H$_{vorig}$≦5.0, ΔH$_v$/H$_{vorig}$≧0.3.

3. An ice confection according to claim 1, having a contiguity of at least 0.2 and an ice content of from 50 to 90% by weight when measured at −18° C.

4. An ice confection according to claim 1, having a Euler-Poincare characteristic of less than −150 mm$^{-2}$ and an ice content of from 50 to 90% by weight when measured at −18° C.

5. An unaerated ice confection according to claim 1 wherein the ice confection is selected from a water ice and a milk ice.

6. An unaerated ice confection according to claim 1, wherein the antifreeze protein is chosen such that it gives an aspect ratio of more than 1.9 to the ice crystal.

7. An unaerated ice confection according to claim 1 wherein the antifreeze protein is AFP Type III HPLC 12.

8. An unaerated ice confection according to claim 1 wherein the pieces have a thickness of from 0.5 to 5 mm.

* * * * *